United States Patent [19]

Haynie

[11] Patent Number: 4,641,706

[45] Date of Patent: Feb. 10, 1987

[54] VERTICAL SHELL AND TUBE HEAT EXCHANGER WITH SPACER OR CLIP TO FORM UNIFORM THICKNESS FALLING FILMS ON EXTERIOR SURFACES OF TUBES

[75] Inventor: Timothy J. Haynie, Lockport, Ill.

[73] Assignee: Chicago Bridge & Iron Company, Oak Brook, Ill.

[21] Appl. No.: 668,409

[22] Filed: Nov. 5, 1984

[51] Int. Cl.⁴ .............................................. F28D 3/00
[52] U.S. Cl. ................................... 165/118; 261/153; 239/132.1
[58] Field of Search ................ 165/115, 118; 239/128, 239/132.1, DIG. 7; 261/153

[56] References Cited

U.S. PATENT DOCUMENTS

| 1,631,162 | 6/1927 | Sebald | 165/115 |
| 3,358,750 | 12/1967 | Thomas | 165/115 |
| 3,995,663 | 12/1976 | Perry | 165/118 X |
| 4,519,448 | 5/1985 | Allo et al. | 261/153 X |

FOREIGN PATENT DOCUMENTS

| 913782 | 5/1954 | Fed. Rep. of Germany | 165/115 |
| 1190800 | 10/1959 | France | 165/118 |
| 143408 | 8/1960 | U.S.S.R. | 165/115 |

Primary Examiner—Albert W. Davis, Jr.
Assistant Examiner—Peggy A. Neils
Attorney, Agent, or Firm—Marshall, O'Toole, Gerstein, Murray & Bicknell

[57] ABSTRACT

A vertical shell and tube heat exchanger in which the tubes extend through oversized holes in a liquid distribution plate. Liquid flows through the holes and down each tube exterior surface as a falling film. A spacer or clip, desirably of wire, is placed in each hole around each tube to center the tube so that the film has a uniform thickness. The clip is self-locking and remains fixed securely in position.

9 Claims, 5 Drawing Figures

4,641,706

VERTICAL SHELL AND TUBE HEAT EXCHANGER WITH SPACER OR CLIP TO FORM UNIFORM THICKNESS FALLING FILMS ON EXTERIOR SURFACES OF TUBES

This invention relates to vertical falling film heat exchangers containing tubes. More particularly, this invention is concerned with an improved heat exchanger which provides for downward flow of a liquid on the outer or exterior surfaces of the tubes as a thin falling film, thereby increasing heat exchange.

BACKGROUND OF THE INVENTION

Falling film heat exchangers usually include an array of vertical tubes. The tubes can be exposed or surrounded by a shell. The process liquid can be either inside or outside the tube with the heat exchange liquid on the other side.

Although falling film heat exchangers are often used to heat a liquid feed stream, they can be used for cooling such a stream. Falling film heat exchangers of the described types can be used as freeze exchangers for producing fresh water from brackish water and seawater, for concentrating fruit and vegetable juices, and in industrial crystallization processes. See U.S. Pat. No. 4,286,436. As the liquid flows through each tube, it can be cooled enough to crystallize a solid from the liquid. Thus, by cooling seawater, ice is obtained which when separated, washed and melted provides potable water. When a fruit or vegetable juice is similarly chilled, ice forms and is removed to provide a concentrated juice.

Freeze exchangers of the described type can use any cooling liquid to cool a process or feed liquid flowing downwardly in or outside the tubes. Some suitable cooling fluids are refrigerants such as ammonia and Freon brand refrigerants.

Whether the heat exchanger is used to heat or cool a process or feed liquid, it is desirable to be able to control the thickness and uniformity of the falling film on each tube external surface, whether the falling film is a feed liquid or a heat exchange liquid. Existing apparatus, however, does not adequately control or regulate the falling film thickness in an economic manner. There is a need, accordingly, for apparatus which will facilitate supplying the process or feed liquid, or the heat exchange liquid, to the exterior surface of the tubes to produce falling films of uniform thickness and evenly distributed on the exterior surface of each tube in a relatively inexpensive and simple manner.

SUMMARY OF THE INVENTION

According to the invention, a falling film heat exchanger is provided comprising a shell connected to vertically spaced apart horizontally arranged upper and lower tube sheets; a plurality of vertically positioned parallel tubes, with each tube extending through and sealingly connected to a hole in each tube sheet; a distribution plate spaced below the upper tube sheet and sealingly connected to the shell thereby forming a liquid distribution space between the distribution plate and the upper tube sheet, with said parallel tubes extending through oversized walled holes in the distribution plate; at least three vertical spaced apart elongated spacers in each oversized hole, with each spacer substantially in contact, or contiguous, with both the adjacent tube and the hole wall thereby maintaining the tube in fixed position relative to the hole wall; means to feed a liquid to the distribution space and means to withdraw the liquid as liquid or vapor from the shell side of the heat exchanger; and a liquid distribution box positioned above the upper tube sheet and means to deliver a liquid to the liquid distribution box.

By keeping each tube spaced from the hole wall, an annulus is formed through which heat exchange liquid, or process or feed liquid, can flow and form a thin downwardly flowing film on the tube exterior surface. The thickness of the film so formed will depend on the width of the annulus comprising the space between the tube exterior wall and the oversized hole wall. The annulus width, furthermore, will generally be only slightly larger than the thickness of the spacers so as to provide clearance to insert the tube after the spacers have been inserted in the hole.

The tubes and holes desirably are circular thereby providing an annular space therebetween through which a liquid can flow downwardly as a thin falling film on the tube external surface.

To best maintain the tube centered in the hole and to keep it stationary, the spacers are approximately equally spaced apart.

For convenience in handling and installation, adjacent spacers are connected to headers located above or below, desirably in an alternating pattern, the distribution plate. Each header can be a thin elongated member positioned close to the distribution plate top or bottom surface. Further, a substantial portion of each header member can be arced to a segment of a circle having a diameter slightly larger than the hole to thereby space the header away from the annular space so the header will not adversely affect liquid flow to the annular space. Also, each header member can have a lateral branch extending from the end of the arced segment to the spacer.

The headers can be connected to all but two of the spacer ends and those two spacer ends can have short branching arms close to the distribution plate.

In a particular embodiment, the spacers and headers are part of a unitary clip formed of a single piece of wire.

According to another aspect of the invention a clip is provided for centering a tube extending through an oversized hole in a plate, with an annular space between the hole wall and tube surface, comprising at least three vertical spaced apart spacers having a thickness about equal to but no greater than the width of the annular space and a length at least slightly greater than the plate thickness; and a horizontal header connected to the ends of each pair of adjacent spacers so that the headers can be located above or below the plate.

Each header can be a thin elongated member adapted to be placed substantially adjacent to the plate top or bottom surface. A substantial portion of each header member can be arced to a segment of a circle having a diameter slightly larger than the plate hole. Furthermore, each header member can have a lateral branch extending from the end of the arced segment to the spacer.

DETAILED DESCRIPTION OF THE DRAWINGS

To the extent it is reasonable and practical, the same elements or parts which appear in the various views of the drawings will be identified by the same numbers.

Figure 1:
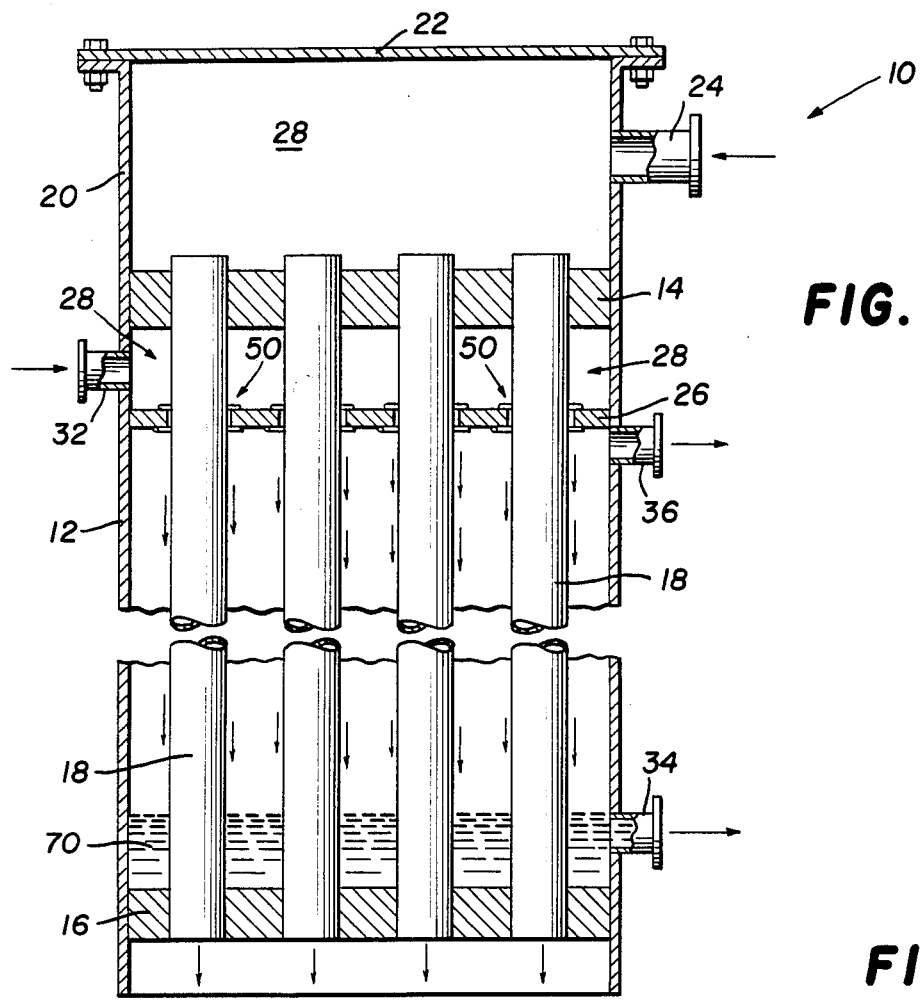
FIG. 1 is a vertical sectional view of a falling film heat exchanger according to the invention having a distribution plate, spaced below the upper tube sheet, with oversized holes through which the heat exchanger tubes extend and with spacers between each tube and hole wall.
Figure 2:
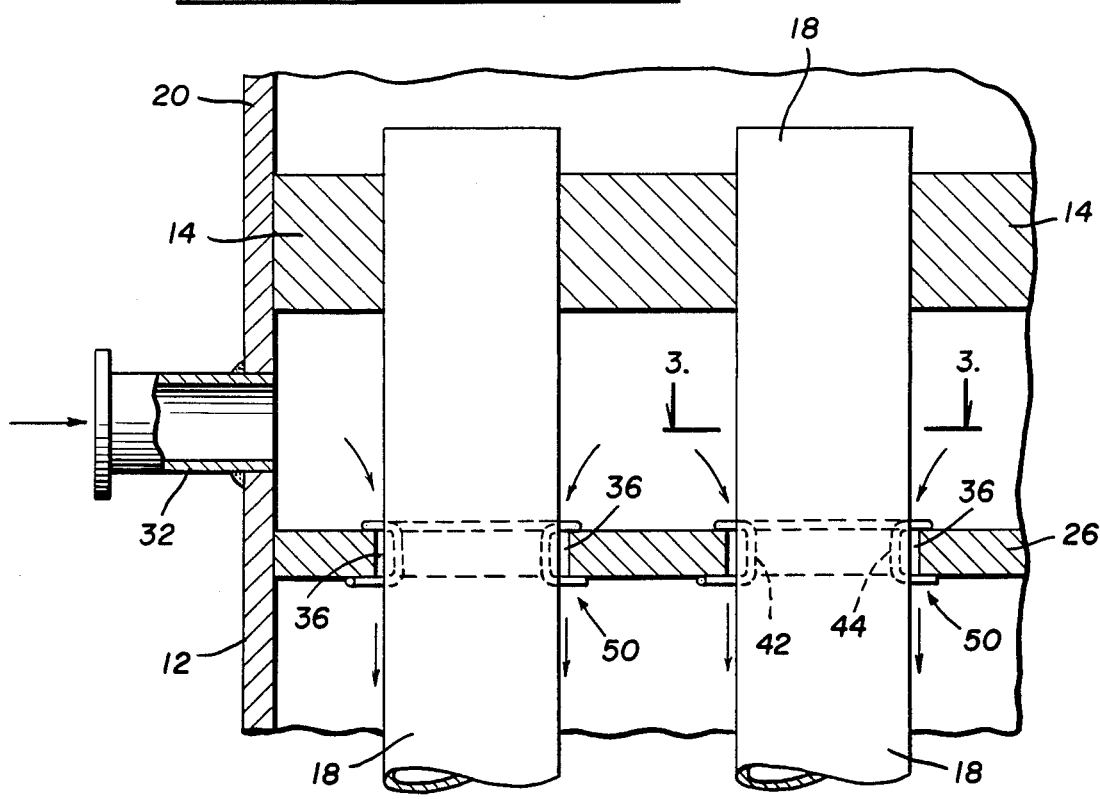
FIG. 2 is an enlarged sectional view of a portion of the distribution plate showing the spacers between each tube and hole wall.

With reference to FIG. 1, the falling film heat exchanger 10 has a shell 12 connected to vertically spaced apart horizontally arranged upper tube sheet 14 and lower tube sheet 16. A plurality of vertically positioned parallel tubes 18 extend through and are sealingly connected to each tube sheet. A portion 20 of shell 12 extends above upper tube sheet 14. Optionally, a removable cover 22 can be mounted on the top of shell portion 20. The shell portion 20, cover 22 and upper tube sheet 14 define a liquid distribution box to which liquid can be supplied by port or opening 24.

Circular distribution plate 26 is spaced below upper tube sheet 14 and is sealingly connected to the shell 12, thereby forming a liquid distribution space 28 between the distribution plate 26, upper tube sheet 14 and shell 12. The distribution plate 26 contains a plurality of oversized walled circular holes 30 (FIG. 5) through each of which a tube 18 extends.

Liquid inlet port 32 in shell 12 provides means for feeding liquid into the distribution space 28. Furthermore, the ports 34 and 36 communicate with the shell side of the heat exchanger space between distribution plate 26 and lower tube sheet 16. Vapor is removed from the upper portion of that space through port 36 and liquid is removed from the lower portion of that space through port 34 as shown in FIG. 1.

Each oversized circular hole 30 in distribution plate 26, and the adjacent circular cylindrical surface of tube 18 extending through the hole, defines an annular opening or space 36 through which liquid can flow from distribution space 28 downwardly on the tube as a thin falling film. The liquid can be a product liquid or a heat exchange liquid, depending on the desired goal to be achieved.

To guarantee that the tube 18 will be axially located in hole 30 during fabrication of the heat exchanger and its subsequent use, at least three vertical spaced apart elongated spacers 40, 42, 44 are positioned in the hole. Each spacer 40, 42, 44 is substantially in contact, or contiguous, with both the adjacent tube and the hole wall thereby maintaining the tube in fixed position relative to the hole wall.

Figure 3:
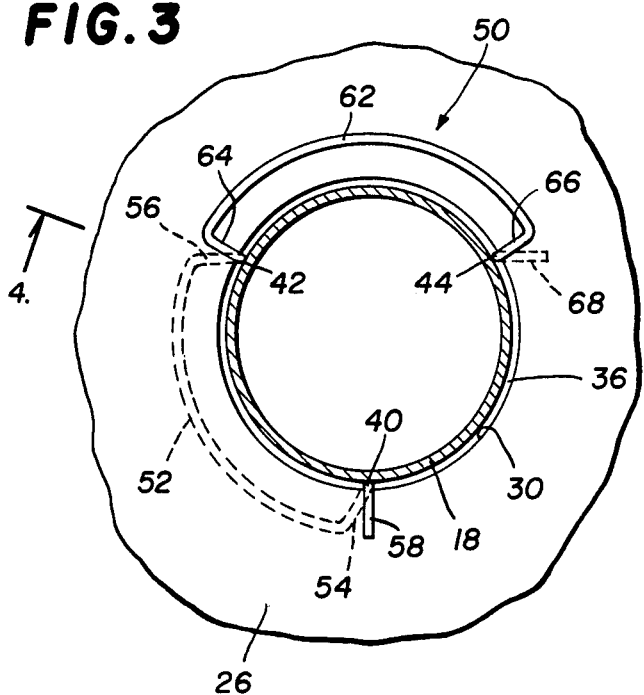
FIG. 3 is a sectional view taken along the line 3—3 of FIG. 2.
Figure 4:
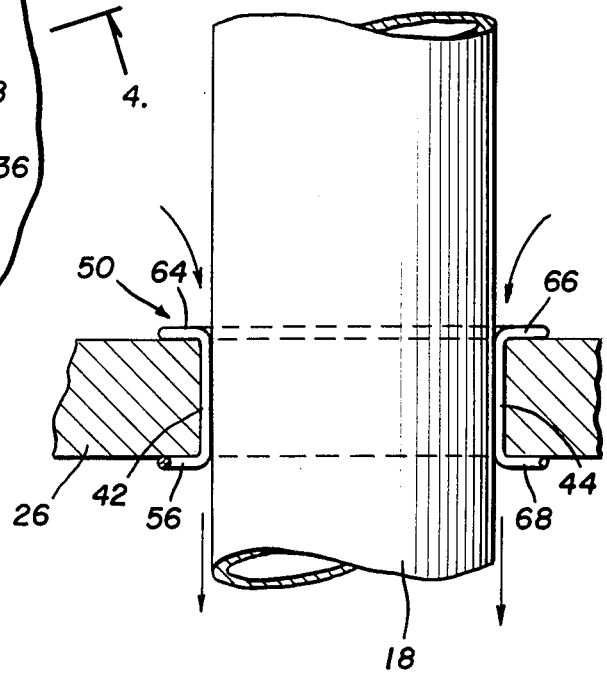
FIG. 4 is a sectional view taken along the line 4—4 of FIG. 3.
Figure 5:
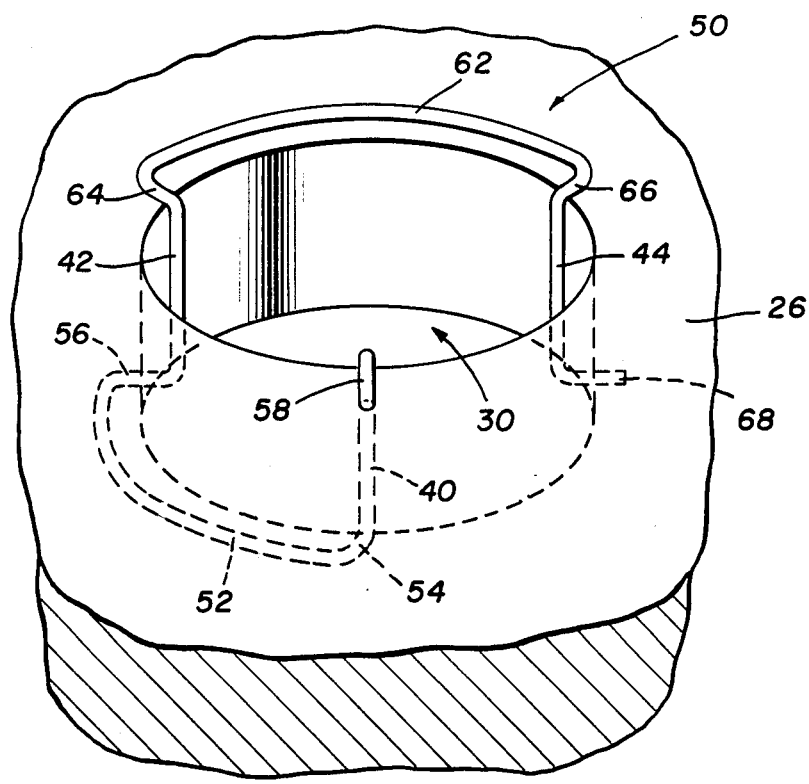
FIG. 5 is an isometric view of the spacers mounted in an oversized hole of the distribution plate.

In the embodiment illustrated by the drawings, the spacers 40, 42, 44 are an integral or unitary part of a clip 50 made of wire (FIGS. 3 to 5). Each spacer has a thickness about equal to but no greater than the width of the annular space 36 and a length at least slightly greater than the distribution plate 26 thickness.

A horizontal header 52 (FIGS. 3 and 5) is connected to the ends of the pair of spacers 40, 42 by lateral branches 54, 56. The header 52 is in the shape of a segment of a circle having a diameter slightly larger than hole 30. Similarly, a horizontal header 62 is connected to the ends of the pair of spacers 42, 44 by lateral branches 64, 66. The header 62 is in the shape of a segment of a circle having a diameter slightly larger than hole 30. A short branching lateral arm 58 is provided at the upper end of spacer 40 and is adapted to be close to the top surface of distribution plate 26. In addition, a short branching lateral arm 68 is provided at the lower end of spacer 44 and it is adapted to be close to the bottom surface of distribution plate 26.

The described clip 50, desirably made of spring wire, is readily placed in hole 30 by temporarily squeezing the spacers 40, 44 together to reduce the effective diameter of the clip and then inserting it in the hole. The clip expands upon release until the spacers 40, 42, 44 are substantially in contact, or contiguous, with the walled hole 30. The clip will not fall out of the hole, or be removed or displaced when a tube is later put in the hole because the headers 52, 62, branches 54, 56, 64, 66 and arms 58, 68 prevent it from being forced out. The clip thus provides for rapid fabrication and assembly of the tubes in the distribution plate 26. Most important, the clip accurately spaces the tube in the oversized hole and keeps the annular space 36 uniform in width on all sides of the tube, thereby permitting the falling film of liquid to be of uniform thickness all around the tube.

The described apparatus is particularly useful as a freeze exchanger in which a process or product liquid is cooled in the tubes by heat exchange with a cooling liquid, such as a refrigerant, on the shell side. Specifically, liquid ammonia can be fed through inlet port 32 to distribution space 28. The ammonia flows downward through annular spaces 36 as falling films on tubes 18. As a result of heat exchange with the process liquid, some ammonia is vaporized. The ammonia vapor can be removed through outlet port 36 although it can be removed through outlet port 34 if the amount of ammonia fed to the heat exchanger does not result in formation of a pool 70 at the bottom. When the refrigerant flow leads to formation of liquid ammonia pool 70, the excess liquid ammonia can be withdrawn out port 34 and returned through port 32. The ammonia vapor withdrawn through port 36 can also be returned to the refrigeration unit.

The foregoing detailed description has been given for clearness of understanding only, and no unnecessary limitations should be understood therefrom, as modifications will be obvious to those skilled in the art.

What is claimed is:

1. An external falling film heat exchanger comprising:
a shell connected to vertically spaced apart horizontally arranged upper and lower tube sheets;
a plurality of vertically positioned parallel tubes, with each tube extending through and sealingly connected to a hole in each tube sheet;
a distribution plate spaced below the upper tube sheet and sealingly connected to the shell thereby forming a liquid distribution space between the distribution plate and the upper tube sheet, with said parallel tubes extending through oversized walled holes in the distribution plate;
at least three vertically positioned, horizontally spaced apart elongated spacers in each oversized hole, with each spacer substantially in contact with and independent of both the adjacent tube and the hole wall thereby maintaining the tube in fixed position relative to the hole wall;

means to feed a liquid to the distribution space and means to withdraw the liquid as liquid or vapor from the shell side of the heat exchanger; and a liquid distribution box positioned above the upper tube sheet and means to deliver a liquid to the liquid distribution box.

2. A falling film heat exchanger according to claim 1 in which the tubes and holes are circular thereby providing an annular space therebetween through which a liquid can flow downwardly as a thin falling film on the tube external surface.

3. An external falling film heat exchanger comprising:

a shell connected to vertically spaced apart horizontally arranged upper and lower tube sheets;

a plurality of vertically positioned parallel tubes, with each tube extending through and sealingly connected to a hole in each tube sheet;

a distribution plate spaced below the upper tube sheet and sealingly connected to the shell thereby forming a liquid distribution space between the distribution plate and the upper tube sheet, with said parallel tubes extending through oversized walled holes in the distribution plate;

the tubes and holes being circular thereby providing an annular space therebetween through which a liquid can flow downwardly as a thin falling film on the tube external surface;

at least three vertically positioned, horizontally spaced apart elongated spacers in each oversized hole, with each spacer substantially in contact with and independent of both the adjacent tube and the hole wall thereby maintaining the tube in fixed position relative to the hole wall;

adjacent spacers being connected to headers located above or below the distribution plate;

means to feed a liquid to the distribution space and means to withdraw the liquid as liquid or vapor from the shell side of the heat exchanger; and a liquid distribution box positioned above the upper tube sheet and means to deliver a liquid to the liquid distribution box.

4. A falling film heat exchanger according to claim 3 in which the spacers are approximately equally spaced apart.

5. A falling film heat exchanger according to claim 3 in which each header is a thin elongated horizontal member positioned close to the distribution plate top or bottom surface.

6. A falling film heat exchanger according to claim 5 in which a substantial portion of each header member is arced to a segment of a circle having a diameter slightly larger than the hole.

7. A falling film heat exchanger according to claim 6 in which each header member has a lateral branch extending from the end of the arced segment to the spacer.

8. A falling film heat exchanger according to claim 7 in which the headers are connected to all but two of the spacer ends and those two spacer ends have short branching arms close to the distribution plate.

9. A falling film heat exchanger according to claim 3 in which the spacers and headers are part of a unitary clip formed of a single piece of wire.

* * * * *